United States Patent [19]
Ishimoto et al.

[11] Patent Number: 5,590,394
[45] Date of Patent: Dec. 31, 1996

[54] DATA TRANSMISSION SYSTEM FOR CATV SYSTEMS WITH CAPABILITY TO INTERRUPT THE REPEATED TRANSMISSION OF CHARACTER INFORMATION BLOCKS TO SEND PRIORITY UPDATES

[75] Inventors: Masaaki Ishimoto; Takehito Toyota, both of Kanagawa-ken, Japan

[73] Assignee: Mitsubishi Denki Kabushiki Kaisha, Tokyo, Japan

[21] Appl. No.: 417,432

[22] Filed: Apr. 3, 1995

Related U.S. Application Data

[63] Continuation of Ser. No. 70,015, Jun. 1, 1993, abandoned, which is a continuation of Ser. No. 610,401, Nov. 7, 1990, abandoned.

[30] Foreign Application Priority Data

Nov. 15, 1989 [JP] Japan ..................... 1-296673

[51] Int. Cl.$^6$ .............. H04N 7/10; H04N 7/087
[52] U.S. Cl. .............. 455/6.1; 348/6; 348/461; 348/478; 348/719
[58] Field of Search ................. 348/478, 714, 348/718, 719, 461, 6; 455/5.1, 6.1; H04N 7/08, 7/087, 7/10

[56] References Cited

U.S. PATENT DOCUMENTS

| | | | |
|---|---|---|---|
| 4,862,268 | 8/1989 | Campbell | 358/142 |
| 4,868,866 | 9/1989 | Williams, Jr. | 358/86 |
| 4,992,871 | 2/1991 | Bensch | 358/147 X |

OTHER PUBLICATIONS

Rundfunktechnische Mitteilungen, Gerhard Eitz, vol. 28, No. 6, Nov., 1984, pp. 273–289.

13th Int. TV Symposium Montreux May 28–Jun. 2, 1983. pp. 418–430.

IEEE Global Telecommunications Conference, Atlanta, GA, 1984.

K. F. James, Full Channel Teletext; 1983, $13^{th}$ Int. TV Symposium Montreux, pp. 418–430.

Eitz, Combiner for Videotext Signals; Rundfunktechnische Mitteilungen, vol. 28, #6, 1984 pp. 273–289.

*Primary Examiner*—John K. Peng
*Assistant Examiner*—John W. Miller
*Attorney, Agent, or Firm*—Wolf, Greenfield & Sacks, P.C.

[57] ABSTRACT

A data transmission system for sending a plurality of signals from a sender to at least one receiving terminal. The sender comprises a memory for storing the plurality of signals, and a controller for causing the stored plurality of signals to be sent in a predetermined order, and for changing the predetermined order when the updating of a signal takes place, so that an updated signal is sent with priority to the receiving terminals.

19 Claims, 3 Drawing Sheets

DATA TRANSMISSION SYSTEM FOR CATV SYSTEMS WITH CAPABILITY TO INTERRUPT THE REPEATED TRANSMISSION OF CHARACTER INFORMATION BLOCKS TO SEND PRIORITY UPDATES

This application is a continuation of application Ser. No. 08/070,015 filed on Jun. 1, 1993 now abandoned which is a continuation application of application Ser. No. 07/610,401 filed on Nov. 7, 1990 now abandoned.

BACKGROUND OF THE INVENTION

1. Field of the Invention

The present invention relates to an improvement of a data transmission system suitable for CATV (cable television) systems.

2. Related Art

In a CATV system, video signals such as signals from VTRs or ITVs and signals of commercial broadcasting programs are transmitted from a sender through a transmission line (for example, a coaxial cable) to terminals such as tuners and video monitors.

It has become the practice in recent CATV systems that in order to cope with the diversification of information, character information blocks produced on a computer are sent to terminals in the form of character codes, along with video signals such as animation signals of the NTSC system, such character information blocks being displayed in color on monitors at the terminals. Such character information blocks are usually transmitted to terminals by assigning appropriate frequency bands in an operating frequency range to the character information blocks and by effecting a frequency-shift-keying or phase-shift-keying modulation of the character information blocks. In order to inhibit a wide frequency band from being occupied, it is common that a plurality of character information blocks are sent serially through one frequency band.

In a CATV data transmission system of the prior art, a plurality of video sources such as VTR, ITV and received signals of commercial broadcasting programs are respectively connected to video modulators to which different carrier frequencies are assigned. The modulated video signals are sent through a transmission line to tuners in receiving terminals. Character information blocks produced on a computer are fed through an adapter to an FSK modulator and sent to the tuners along with the modulated video signals. These video signals and character information blocks are demodulated at the tuners and displayed on monitors at selected channels.

FIG. 1 shows a manner by which character information blocks are serially sent in a CATV system of the prior art. In this figure, each information block D1, D2 ... or Di includes character information to be displayed on one picture and comprises identification data, code data and property data. If one character picture is of the size of (80 columns)×(20 rows), the amount of the code data is 1600 bytes and if each property is defined by one byte, the property data is also 1600 bytes. FIG. 1 indicates that a plurality number i of information blocks D1, D2, . . . , Di are sent in one cycle.

At each receiving side, an operator designates a picture number to display, on a monitor, a character information block having the identification data corresponding to the designated picture number. Since the information transmission is effected uni-directionally just as in broadcasting and the character information blocks are received at terminals regardless of the order in which the character information blocks are sent, the character information blocks are at all times sent cyclically.

FIG. 2 is a block diagram showing the construction of an adapter 100 used in a CATV system of the prior art. Character information blocks D1, D2, . . . , Di produced serially on a computer are fed through an input interface 102 to a buffer memory 104 in an adapter 100. The stored blocks are sequentially taken out of the buffer memory 104 under the control of a data transmission control unit 106 and sent through an output interface 108 to an FSK modulator.

As could be understood from the above description, the adapter serves to store character information blocks in the buffer memory 104 and cyclically sends the stored character information blocks at a constant period. The computer provides new character information blocks to the adapter only when the updating of character information blocks takes place. It is thus unnecessary for the computer to deal with the control of information transmission, which reduces a load on the computer. On the other hand, it should be noted that, even when the updating of information blocks takes place, the computer is requested to send, as character information blocks for the initial picture, the whole character information blocks for a complete picture including new character information blocks produced when the updating of information blocks takes place.

In a data transmission system of a prior art CATV system, since the order of character information blocks produced on a computer and sent toterminals is fixed even when some character information blocks are requested to be updated, it usually takes some time for new character information blocks to reach a terminal from a sender, which results in a significant delay in the time taken to update information blocks to be displayed at monitors. Such a problem becomes more serious as the number of character pictures increases. For example, it takes 100 milliseconds to transmit a character information block for one picture, and therefore it takes 100×100 milliseconds to transmit character information blocks for 100 pictures.

In order to solve this problem, Japanese Patent Public Disclosure No. 157488/87 proposes that each terminal has a means by which character information blocks received at the terminal are stored in a data memory while some information blocks are renewed with the latest ones and the character information blocks stored in the data memory and included in a designated picture are read out from the data memory to be displayed. This can shorten the time taken to display updated information blocks.

Since such a means as described above is provided at a terminal, however, each terminal must have a data extracting circuit, line buffers, data storing RAMs and the like, which makes the circuit construction complicated.

SUMMARY OF THE INVENTION

It is an object of the invention to provide a data transmission system wherein the updating of information data is effected at a sending side within a minimum delayed time and each terminal has a simple circuit construction.

in order to achieve the above-described object, the present invention provides a data transmission system for sending a plurality of signals from a sender to at least one receiving terminal. The sender comprises:

means for storing the plurality of signals;

means for causing the stored plurality of signals to be sent in a predetermined order; and means for changing the predetermined order when the updating of signal takes place, so that an updated signal is sent with priority to said receiving terminals.

According to the construction described above, the present invention is advantageous in that data transmission can be effected at higher speed and that the respective terminals can have a simpler structure.

Other objects and advantages of the invention will become clear from the following description taken in conjunction with the accompanying drawings.

DETAILED DESCRIPTION OF THE PREFERRED EMBODIMENTS

Figure 1:
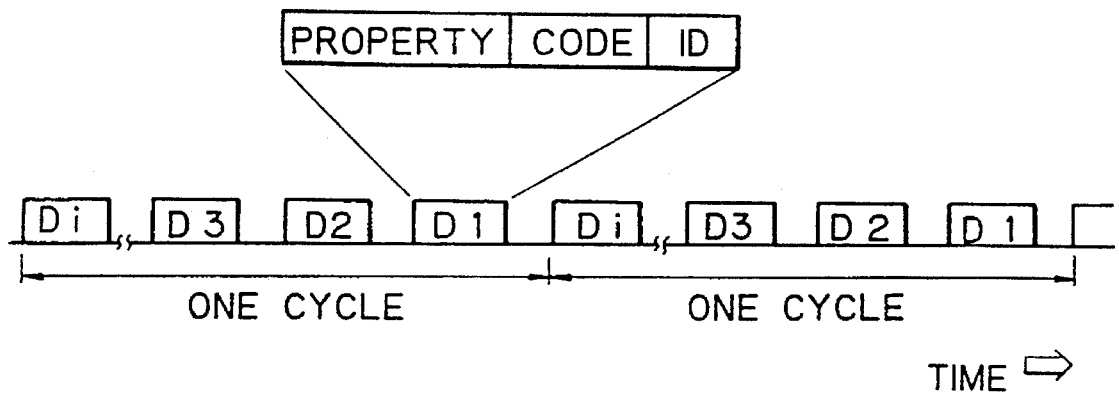
FIG. 1 shows a manner by which character information blocks are sent serially in a CATV system of the prior art.
Figure 2:
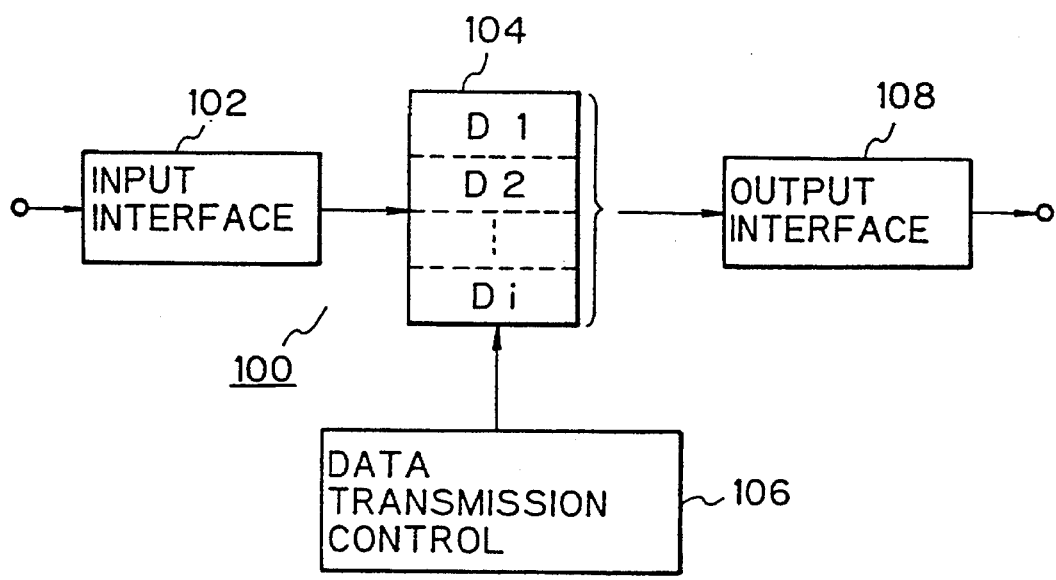
FIG. 2 is a block diagram showing the construction of an adapter used in a sender of a prior art CATV system.
Figure 3:
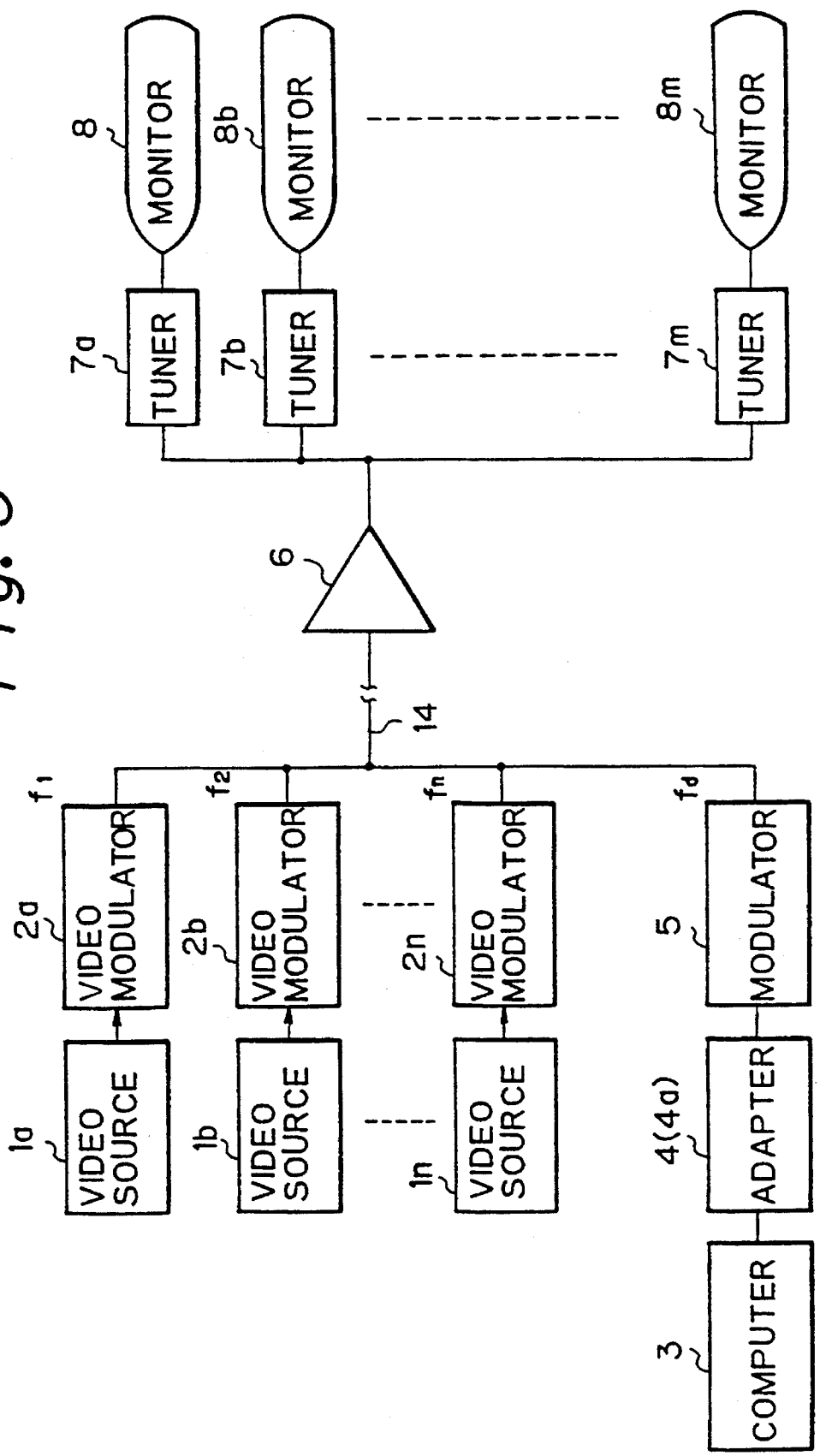
FIG. 3 schematically shows an embodiment of a data transmission system according to the present invention.

FIG. 3 is a block diagram schematically showings an embodiment of a data transmission system for a CATV system in accordance with the present invention. In this figure, video signal sources $1a, 1b, \ldots, 1n$ supplying video signals from VTRs or ITVs or video signals of commercial broadcasting programs are connected to corresponding video modulators $2a, 2b, \ldots, 2n$. Carrier frequencies $f_1, f_2, \ldots, f_n$ are assigned to the respective video modulators so as to correspond receiving channels.

A computer 3 produces character information blocks, each block including character information to be displayed on one picture. The character information blocks are sent through an adapter 4 to an FSK modulator 5 where the character information blocks are frequency-shift-keying modulated using a carrier frequency $f_d$. The video signals output from the video modulators $2a, 2b, \ldots, 2n$ and the character information blocks output from the FSK modulator 5 are sent to a transmission line 14. In order to compensate for attenuation in these signals, an amplifier 6 is provided the middle of the transmission line to amplify the video signals and the character information blocks.

The amplified video signals and character information blocks are input to tuners $7a, 7b, \ldots, 7m$ at terminal sides and demodulated thereat to be displayed on video monitors $8a, 8b, \ldots, 8m$ at channels which operators select.

Figure 4:
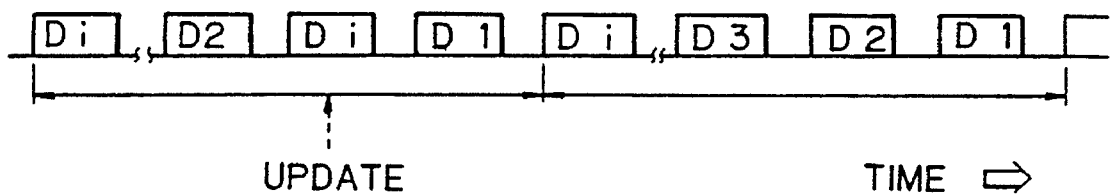
FIG. 4 shows a manner by which character information blocks are sent serially in the data transmission system according to the present invention.

FIG. 4 shows the manner in which character information blocks are serially sent in accordance with the present invention. This figure indicates that a series of character information blocks D1, D2, ..., Di have been sent in a first cycle and that, when the updating of the character information block Di takes place Just after the character information block D1 has been sent in a second cycle, the updated character information block Di is sent immediately behind the character information block D1.

Figure 5:
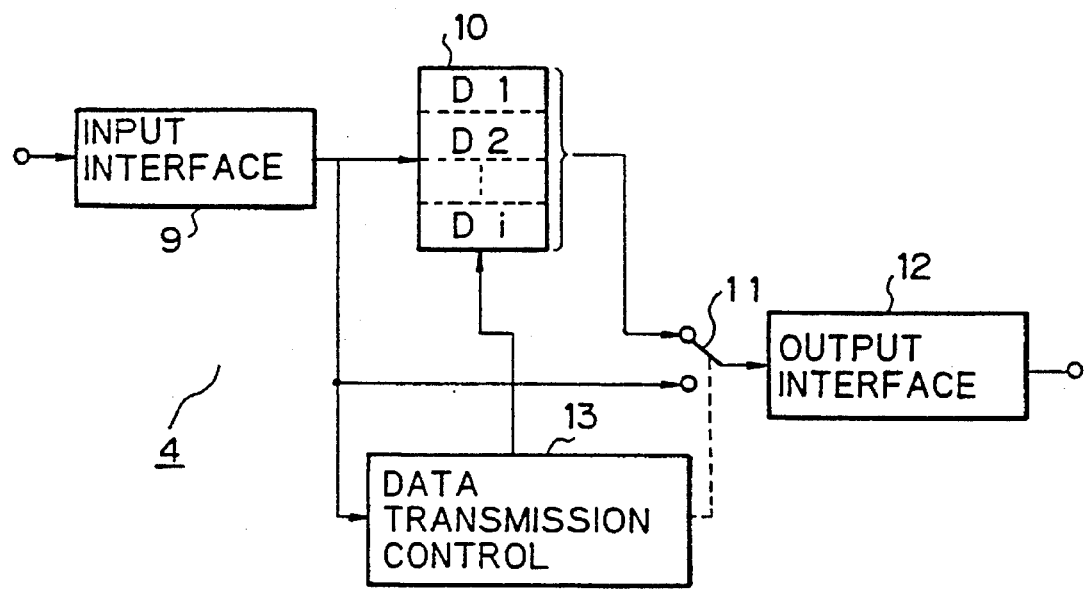
FIG. 5 is a block diagram showing the construction of an adapter used in a sender of the system shown in FIG. 3.

Next, an operation of the adapter 4 shown in FIG. 3 will be explained with reference to FIG. 5 schematically showing the construction of the adapter 4. Character information blocks D1, D2, ..., Dn sent from the computer 3 are input through an input interface 9 to a buffer memory 10 and stored therein. Character information blocks output from the buffer memory 10 are fed through a switch 11 to an output interface 12. The buffer memory 10 and the switch 11 are controlled by a data transmission control unit 13.

When the updating of a character information block does not take place, the stored character information blocks are taken out of the buffer memory 10 in the order in which the information blocks are stored in the buffer memory 10, and sent sequentially through the switch 11 to the output interface 12. On the other hand, when an updated character information block is provided from the computer 3 to the adapter 4, the data transmission control unit 13 detects this fact and interrupts the taking of the character information blocks out of the buffer memory 10. The switch 11 is then changed to connect to the input interface 9 and the updated character information block is sent through the output interface 12. At the same time, the updated character information block is stored in a corresponding area in the buffer memory 10. It is noted that whether a character information block is an updated one or not is simply decided in accordance with information supplied from the computer 3.

As can be understood from the description above, when a character picture displayed on a monitor which an operator watches should be updated to another, a character information block to be updated is immediately sent to the terminal side, which results in a shortening of the transmission time. Moreover, the transmission side is constructed such that an updated character information block is sent with priority, which serves to simplify a circuit construction of each terminal.

The present invention has been described in detail with particular reference to a certain embodiment thereof, but it should be understood that modifications and variations can be effected within the scope and spirit of the invention. For example, in the embodiment describe above, the explanation has been given to the case where the computer provides an updated character information block for one picture. Instead, it is possible to send an actually updated portion of a character information block from the computer to the adapter which, in response to the updated portion, modifies a corresponding information block stored in the buffer memory and sends the modified block. Such an operation can easily be accomplished by defining a PARTIALLY UPDATE information signal as one of the signals which the computer outputs to the adapter and rewriting the buffer memory when the adapter detects the PARTIALLY UPDATE information signal.

Further, a signal provided from the computer to the adapter is not limited to a character information block. The computer can provide a control information signal by which a particular action is designated to be taken at the terminal sides.

What is claimed is:

1. A data transmission system for a cable access television (CATV) system, said data transmission system comprising:

a buffer, having an input to receive character information blocks and an output that provides a plurality of character information blocks in a predetermined order, that stores the plurality of character information blocks in the predetermined order;

a transmitter, coupled to the buffer, that transmits character information blocks over CATV transmission lines; and a control means for controlling the buffer and the transmitter so that the transmitter transmits the character information blocks, stored in the buffer, in the predetermined order, and upon detection of an updated transmission block, for interrupting the transmission of the character information blocks in the predetermined order to send the updated character information block with priority.

2. The data transmission system of claim 1, further comprising at least one video source that provides a video signal, and wherein the transmitter transmits the video signal along with the character information blocks over the CATV transmission lines.

3. The data transmission system of claim 1, further comprising a computer coupled to the input of the buffer and to the control unit, that provides the character information blocks and the updated character information block.

4. The data transmission system of claim 3, further comprising a switch having first and second inputs respectively coupled to the buffer and to the computer, an output coupled to the transmitter, and a control input coupled to the control means to receive a control signal, the switch, selecting between the updated character information block and the plurality of character information blocks in the predetermined order in response to the control signal and outputting a selected signal to the transmitter for subsequent transmission over the CATV transmission lines.

5. The data transmission system of claim 1, wherein the control means includes means for replacing one of the plurality of character information blocks, stored in the buffer, with the updated character information block.

6. A data transmission system for a cable access television (CATV) system, said data transmission system comprising:

a buffer, having an input to receive character information blocks and an output that provides a plurality of character information blocks in a predetermined order, that stores the plurality of character information blocks in the predetermined order;

a transmitter that transmits character information blocks over CATV transmission lines; and a control unit, coupled to the transmitter and the buffer, that controls the buffer and the transmitter so that the transmitter repeatedly transmits the character information blocks, stored in the buffer, in the predetermined order, that detects when an updated character information block is received by the data transmission system, and when the updated character information block is received, that interrupts the transmission of the character information blocks in the predetermined order to send the updated character information block over the CATV transmission lines with priority.

7. The data transmission system of claim 6, further comprising at least one video source that provides a video signal, and wherein the transmitter transmits the video signal along with the character information blocks over the CATV transmission lines.

8. The data transmission system of claim 6, further comprising a computer, coupled to the input of the buffer and to the control unit, that provides the character information blocks and the updated character information block.

9. The data transmission system of claim 8, further comprising a switch having first and second inputs respectively coupled to the buffer and to the computer, an output coupled to the transmitter, and a control input coupled to the control unit to receive a control signal, the switch, selecting between the updated character information block and the plurality of character information blocks in the predetermined order in response to the control signal and outputting a selected signal to the transmitter for subsequent transmission over the CATV transmission lines.

10. The data transmission system of claim 6, wherein the control unit includes a replacement circuit that replaces a corresponding one of the plurality of character information blocks, stored in the buffer, with the updated character information block.

11. In a data transmission system for a cable access television (CATV) system, wherein the data transmission system sends a plurality of signals from a transmitter to at least one receiving terminal, said transmitter comprising:

a buffer for storing a plurality of character information blocks in a predetermined order;

a transmission unit comprising means for repeatedly transmitting the plurality of character information blocks in the predetermined order in which the character information blocks are stored in the buffer over CATV transmission lines and means for transmitting video signals along with the character information blocks means for receiving an updated character information block, the updated character information block having information for updating one of the plurality of character information blocks;

means for detecting the receipt of the updated character information block;

means for sending the updated character information block with priority over CATV transmission lines; and means for replacing the character information block in the buffer with the updated character information block so that the means for repeatedly transmitting will transmit the plurality of character information blocks, including the updated character information block.

12. In a data transmission system for a cable access television (CATV) system, wherein the data transmission system repeatedly sends character information blocks from a transmitter to at least one receiving terminal, said transmitter comprising:

computer means for producing character information blocks arranged in a predetermined order, and for producing an updated character information block, the updated character information block having information for updating a corresponding character information block of the plurality of character information blocks;

an adapter including (a) a memory for storing in a predetermined order the character information blocks produced by the computer means, (b) means for receiving the updated character information block and for replacing the character information block to be updated with the updated character information block in the corresponding area of the memory, (c) loop transmission means for transmitting the character information blocks, stored in the memory, including the updated character information block, over CATV transmission lines in the predetermined order, and (d) means for transmitting the updated character information block with priority.

13. The transmitter as claimed in Claim 12 wherein said transmitter further comprises at least one video source for providing a video signal, and wherein the video signal and the character signal blocks are sent together to the terminals.

14. The transmitter as claimed in claim 13, wherein said memory is a buffer memory having a capacity of storing all of the character information blocks produced by said computer means, and further comprising a switch means having an output coupled to the loop transmission means, and an input that in a first position of the switch means is coupled to an output of said buffer memory and in a second position of the switch means is coupled to an output of said computer means, said switch means being controlled so that, when the updating of a character information block does not take place, character information blocks stored in said buffer memory are taken out in the order in which such information blocks are stored, and that, when the updating of a character information block takes place, the updated character information block produced by said computer means is sent with priority to the receiving terminals.

15. A method of repeatedly sending character information blocks in a cable access television (CATV) system from a transmitter to at least one receiving terminal, comprising the steps of:

storing a plurality of character information blocks in a predetermined order at said transmitter;

repeatedly sending the plurality of character information blocks over CATV transmission lines in the predetermined order;

detecting when the transmitter produces an updated character information block;

interrupting the sending of the plurality of character information blocks in the predetermined order;

sending the updated character information block with priority to said receiving terminals;

updating the corresponding character information block of the plurality of stored character information blocks with the updated character information block; and repeatedly sending the plurality of character information blocks, including the updated character information block, over CATV transmission lines in the predetermined order.

16. A method of generating and sending character picture information from a transmitter to at least one receiving terminal, comprising the steps of:

(a) producing character information blocks, each block including character information for one picture;

(b) storing in a buffer the produced character information blocks in a predetermined order;

(c) causing the stored character information blocks to be repeatedly sent over CATV transmission lines in the predetermined order;

(d) producing an updated character information block;

(e) interrupting the repeated sending of character information blocks in a predetermined order to immediately send an updated character information block over the CATV transmission lines; and (f) replacing the character information block to be updated with the updated character information in a corresponding area of the buffer so that it may be later sent in step (c).

17. In a CATV system having a plurality of video sources, each video source having a video modulator producing video signals, the CATV system also having a character information block transmitter producing an output, the output and the plurality of video signals forming a CATV signal for transmission, the character information block transmitter comprising:

a computer means for producing at least one character information block and for producing an updated character information block;

a memory for storing in a predetermined order the at least one character information block produced by the computer means and for providing an output of stored character information blocks;

control means for detecting when the computer means produces the updated information block and for providing a control signal in response thereto;

a switch receiving the output from the memory as a first input and receiving the updated character information block from the computer means as a second input and receiving the control signal as a control input to responsively select between the updated character information block and the memory output and to provide a selected output of the character information block transmitter; and means for replacing the character information block to be updated with the updated character information block in the corresponding area of the memory.

18. The CATV system of claim 17 wherein each of the plurality of video modulators produces a video signal at a corresponding unique carrier frequency and wherein the character information block transmitter provides its output at a carrier frequency different than the carrier frequencies of the video modulators.

19. The character information block transmitter of claim 17 further comprising means for frequency-shift-key modulating of the selected output.

* * * * *